United States Patent
Inoue et al.

(10) Patent No.: US 7,275,178 B2
(45) Date of Patent: Sep. 25, 2007

(54) COMPUTER SYSTEM HAVING FAILURE RECOVERY FUNCTION, AND FAILURE RECOVERY METHOD THEREOF

(75) Inventors: Taro Inoue, Yamato (JP); Nobuhiro Maki, Sagamihara (JP); Kenichi Oyamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 10/787,109

(22) Filed: Feb. 27, 2004

(65) Prior Publication Data

US 2005/0144500 A1  Jun. 30, 2005

(30) Foreign Application Priority Data

Nov. 27, 2003  (JP)  ............... 2003-396619

(51) Int. Cl.
  G06F 11/00 (2006.01)
  G06F 11/16 (2006.01)
(52) U.S. Cl. ............... 714/6; 711/114; 707/204
(58) Field of Classification Search ............ None
  See application file for complete search history.

(56) References Cited

U.S. PATENT DOCUMENTS

| | | | |
|---|---|---|---|
| 5,504,883 A * | 4/1996 | Coverston et al. | 707/202 |
| 5,673,382 A | 9/1997 | Cannon et al. | |
| 5,889,935 A | 3/1999 | Ofek et al. | |
| 6,052,797 A | 4/2000 | Ofek et al. | |
| 6,055,604 A * | 4/2000 | Voigt et al. | 711/117 |
| 6,148,414 A * | 11/2000 | Brown et al. | 714/9 |
| 6,173,377 B1 * | 1/2001 | Yanai et al. | 711/162 |
| 6,647,474 B2 | 11/2003 | Yanai et al. | |
| 7,031,986 B2 * | 4/2006 | Ito | 707/204 |
| 7,043,665 B2 * | 5/2006 | Kern et al. | 714/5 |
| 2001/0007102 A1 | 7/2001 | Gagne et al. | |
| 2002/0138784 A1 * | 9/2002 | Mann et al. | 714/6 |
| 2004/0024975 A1 | 2/2004 | Morishita et al. | |
| 2004/0128442 A1 * | 7/2004 | Hinshaw et al. | 711/114 |

FOREIGN PATENT DOCUMENTS

EP  1 283 469 A2  2/2003

OTHER PUBLICATIONS

"SRDF/Asynchronous (SRDA/A) for Symmetric DMX", Data Sheet, EMC Corporation, unknown date.

* cited by examiner

Primary Examiner—Scott Baderman
Assistant Examiner—Joseph Schell
(74) Attorney, Agent, or Firm—Mattingly, Stanger, Malur & Brundidge

(57) ABSTRACT

An operation site has copy management information including state information that is used when executing a remote copy. The copy management information is stored in a storage device included in each of all storage device subsystems in this computer system. The copy management information is updated every time a remote copy is executed. When the operation site fails, by use of a copy management program in another operatable site, and with reference to the copy management information stored in the storage device of the storage device subsystem in each site, the copy is executed from a point to which the copy processing has progressed before the failure. As a result, when the production site in which an application is operated suffers from a disaster, it is possible to quickly recover data at the time of the disaster by executing a disaster recovery management program from another site in which no failure occurs, and then by restarting the remote copy.

2 Claims, 9 Drawing Sheets

COPY MANAGEMENT TABLE

| | 601 | 602 | 603 | 604 | 605 |
|---|---|---|---|---|---|
| 610 | A STATE OF AN INTER-SUBSYSTEM COPY FROM A STORAGE DEVICE SUBSYSTEM 2a TO A STORAGE DEVICE SUBSYSTEM 2b | A STATE OF AN INTRA-SUBSYSTEM COPY OF THE STORAGE DEVICE SUBSYSTEM 2b | A STATE OF AN INTER-SUBSYSTEM COPY FROM A STORAGE DEVICE SUBSYSTEM 2b TO A STORAGE DEVICE SUBSYSTEM 2c | A STATE OF AN INTRA-SUBSYSTEM COPY OF THE STORAGE DEVICE SUBSYSTEM 2c | TIME STAMP |
| 610a | EXECUTING STATE | DISCONNECTED STATE | INTERRUPTED STATE | DISCONNECTED STATE | 1526874526 |

INTER-SUBSYSTEM PAIR DEFINITION TABLE

| GROUP NAME | PAIR NAME | MAIN PORT | MAIN LU | SUB PORT | SUB LU | STATE |
|---|---|---|---|---|---|---|
| G1 | P1 | PORT 201b | LU0 | PORT 201d | LU0 | ACTIVE |
| G1 | P2 | PORT 201d | LU1 | PORT 201f | LU1 | ACTIVE |
| G1 | P3 | PORT 201b | LU1 | PORT 201d | LU2 | ACTIVE |
| G1 | P4 | PORT 201d | LU3 | PORT 201f | LU3 | ACTIVE |

FIG. 7

INTRA-SUBSYSTEM PAIR DEFINITION TABLE

| GROUP NAME | PAIR NAME | MAIN LU | SUB LU | STATE |
|---|---|---|---|---|
| G11 | P10 | LU0 | LU1 | ACTIVE |
| G11 | P11 | LU2 | LU3 | ACTIVE |

INTRA-SUBSYSTEM PAIR DEFINITION TABLE

| GROUP NAME | PAIR NAME | MAIN LU | SUB LU | STATE |
|---|---|---|---|---|
| G12 | P12 | LU0 | LU1 | ACTIVE |
| G12 | P13 | LU2 | LU3 | ACTIVE |

FIG. 8

VOLUME DEFINITION TABLE (500a)

| PORT (501) | LU (502) | DRIVE (503) | SIZE (504) | IS MANAGEMENT INFORMATION STORED ? (505) |
|---|---|---|---|---|
| PORT 201b | LU0 | DISK 211a | 10 GB | |
| PORT 201b | LU1 | DISK 211f | 10 GB | YES |

VOLUME DEFINITION TABLE (500b)

| PORT (501) | LU (502) | DRIVE (503) | SIZE (504) | IS MANAGEMENT INFORMATION STORED ? (505) |
|---|---|---|---|---|
| PORT 201d | LU0 | DISK 211b | 10 GB | |
| PORT 201d | LU1 | DISK 211c | 10 GB | |
| PORT 201d | LU2 | DISK 211g | 10 GB | YES |
| PORT 201d | LU3 | DISK 211h | 10 GB | YES |

VOLUME DEFINITION TABLE (500c)

| PORT (501) | LU (502) | DRIVE (503) | SIZE (504) | IS MANAGEMENT INFORMATION STORED ? (505) |
|---|---|---|---|---|
| PORT 201f | LU0 | DISK 211e | 10 GB | |
| PORT 201f | LU1 | DISK 211d | 10 GB | |
| PORT 201f | LU2 | DISK 211j | 10 GB | YES |
| PORT 201f | LU3 | DISK 211i | 10 GB | YES |

FIG. 9

COPY MANAGEMENT TABLE

| | A STATE OF AN INTER-SUBSYSTEM COPY FROM A STORAGE DEVICE SUBSYSTEM 2a TO A STORAGE DEVICE SUBSYSTEM 2b | A STATE OF AN INTRA-SUBSYSTEM COPY OF THE STORAGE DEVICE SUBSYSTEM 2b | A STATE OF AN INTER-SUBSYSTEM COPY FROM A STORAGE DEVICE SUBSYSTEM 2b TO A STORAGE DEVICE SUBSYSTEM 2c | A STATE OF AN INTRA-SUBSYSTEM COPY OF THE STORAGE DEVICE SUBSYSTEM 2c | TIME STAMP |
|---|---|---|---|---|---|
| | 601 | 602 | 603 | 604 | 605 |
| 610a | EXECUTING STATE | DISCONNECTED STATE | INTERRUPTED STATE | DISCONNECTED STATE | 1526874526 |

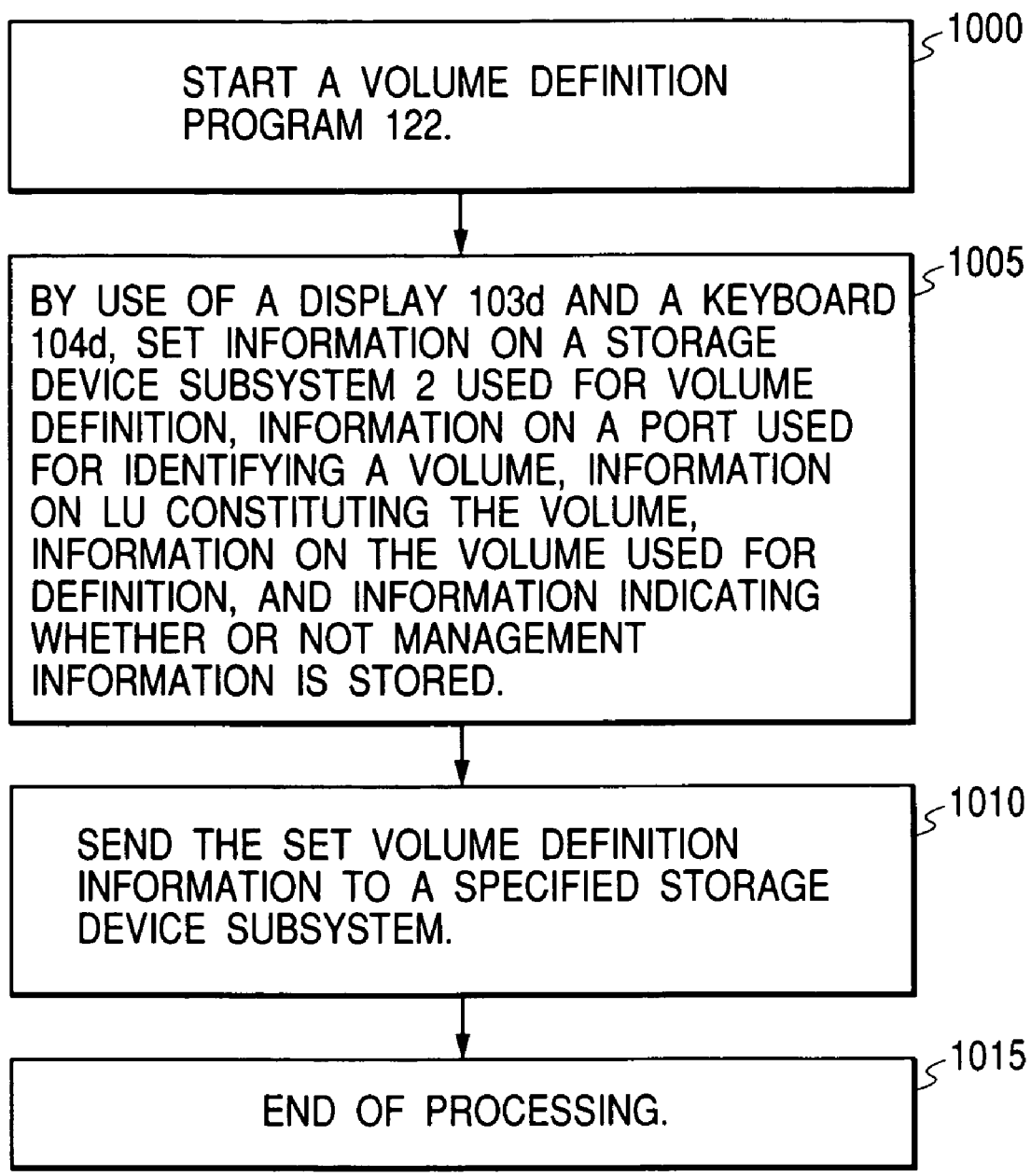

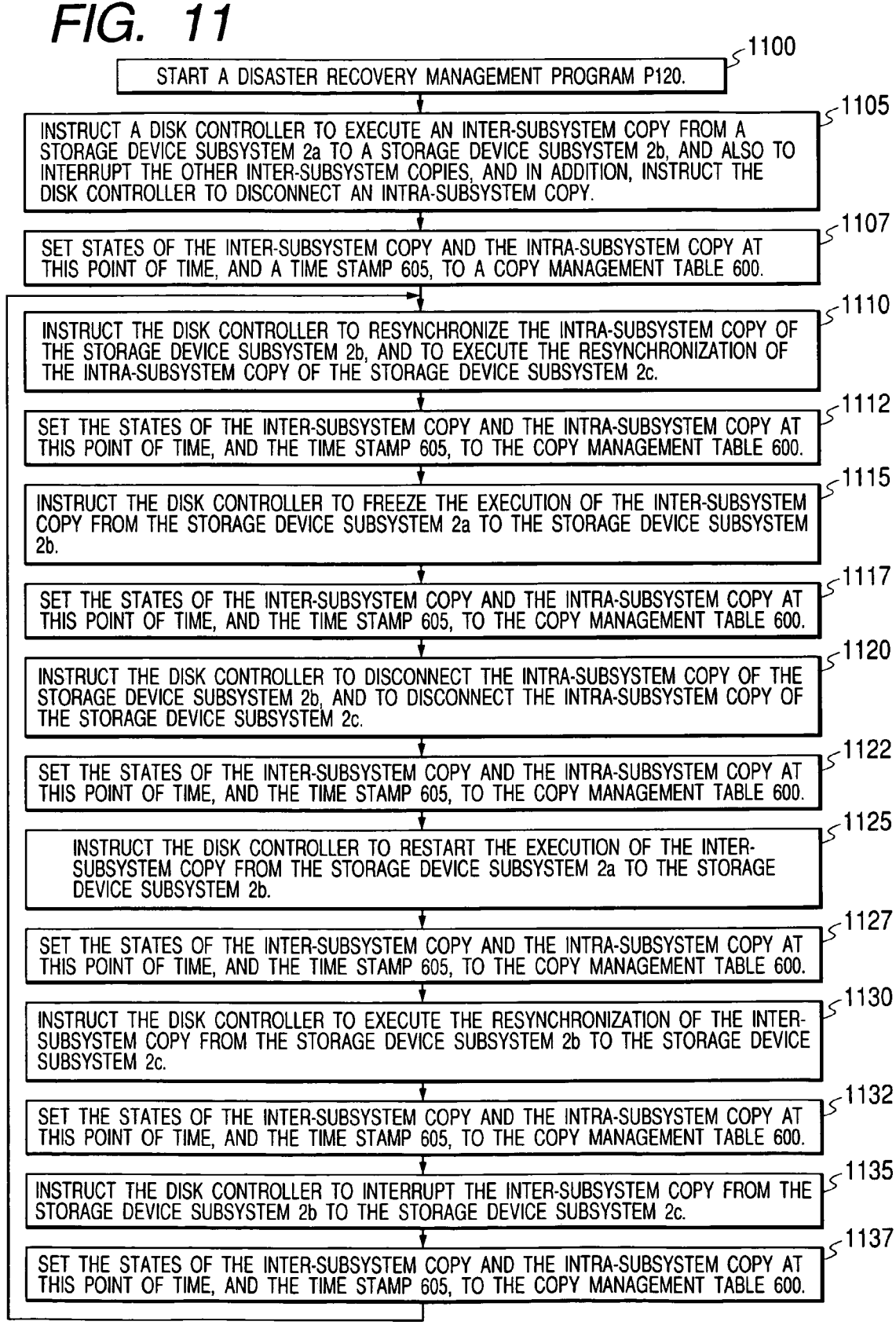

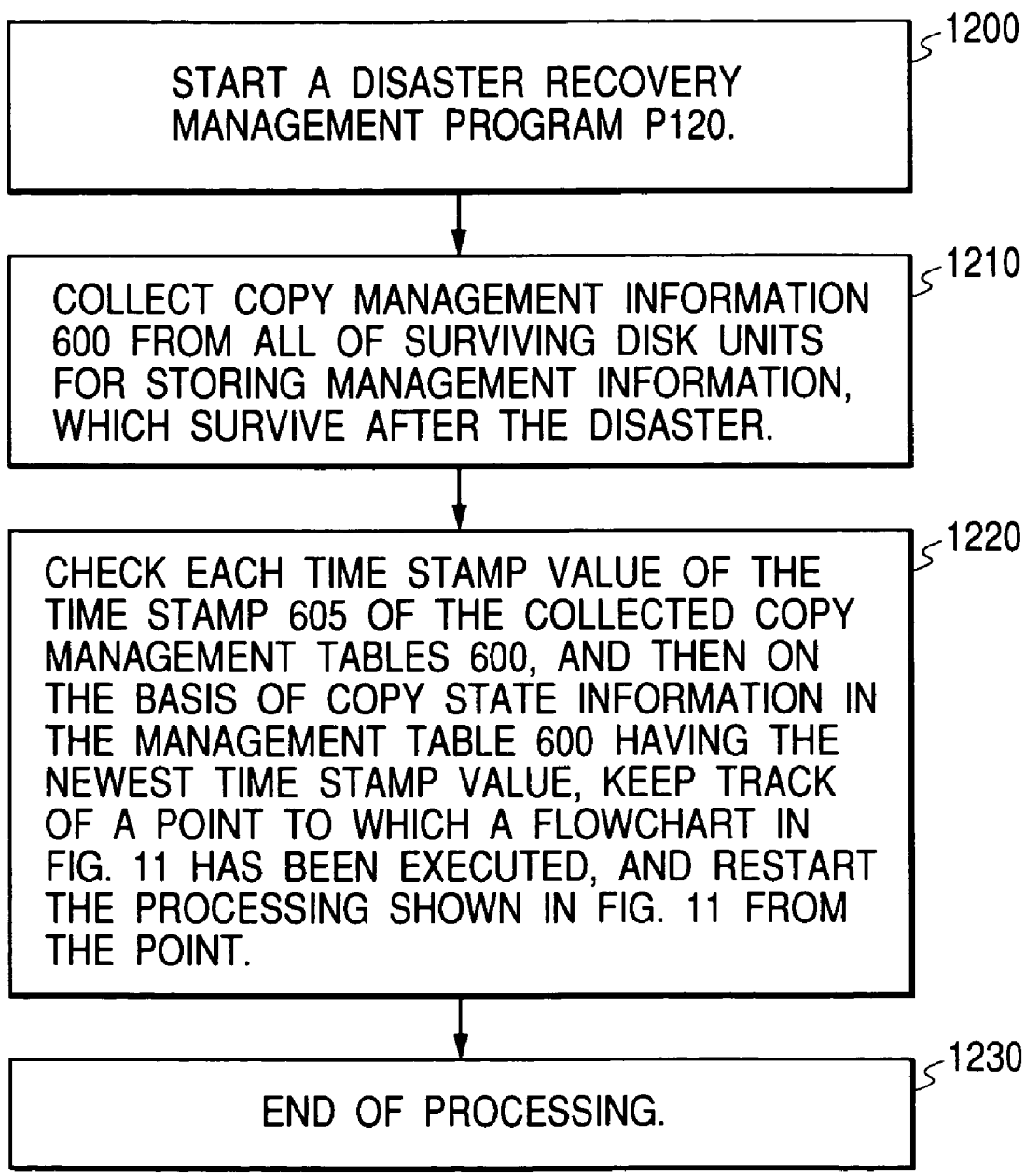

COMPUTER SYSTEM HAVING FAILURE RECOVERY FUNCTION, AND FAILURE RECOVERY METHOD THEREOF

BACKGROUND OF THE INVENTION

The present invention relates to a computer system having a failure recovery function, and more particularly to a computer system having a failure recovery function which is suitable for a disaster recovery system that achieves data integrity at the time of a disaster by remote-copying the data between storage device subsystems.

For the purposes of handling a larger scale system and achieving the higher security of data, a system configuration constituted of two data centers (that is to say, a site where usual operation is performed and a backup site) has been generally used (hereinafter this configuration is referred to as "2DC configuration").

As a disaster recovery system having such a configuration, for example, the technology disclosed in the EMC's home page (http://japan.emc.com/local/ja/JP/products/product_pdfs/srdf/srdf.pdf) is known.

Here, instead of the 2DC configuration constituted of two data centers, that is to say, the site where operation is performed and the backup site, a disaster recovery system having a configuration constituted of three data centers will be reviewed (hereinafter this configuration is referred to as "3DC configuration"). In the description below, a site where usual operation is performed is called "production site"; a site which is closed to the production site is called "local site"; and a site which is far from the production site is called "remote site".

In this disaster recovery system having the 3DC configuration, a storage volume of the production site is remote-copied to a storage volume of the local site, and then the storage volume of the local site is remote-copied to a storage volume of the remote site. This is how data is transferred. At this time, a disaster recovery management program (hereinafter referred to as "disaster recovery management program P") which operates in a host of the production site controls the above-mentioned series of remote copies.

Incidentally, the conventional remote copy technology has the following problem: if the production site where the usual operation is performed suffers from a disaster, management information required for the execution of disaster recovery, which is managed by a disaster recovery management program operating on a host of the production site, cannot be transferred to the other local and remote sites, and therefore data cannot be quickly recovered at the time of the disaster.

The present invention has been devised to solve the above-mentioned problem. An object of the present invention is to provide a computer system having a failure recovery function, in which if a production site where usual operation is performed suffers from a disaster, a disaster recovery management program is executed from another site in which no failure occurs, and thereby the remote copy is restarted to quickly recover data at the time of the disaster.

SUMMARY OF THE INVENTION

According to the present invention, a copy state is written to a copy management table in a production site every time a remote copy is executed. In addition, the copy management table including the copy state is also kept in each of the other sites. These copy states kept in the other sites are then updated in synchronization with the copy state in the production site.

If the production site suffers from a disaster, a disaster recovery management program which operates in a host of a remote site (hereinafter referred to as "disaster recovery management program R") refers to a copy management table in a site where no disaster occurs, and then restarts copy processing from a point at which the copy processing has been stopped by the disaster.

As a result, the newest data immediately before the usual operation site has suffered from the disaster is copied to another operatable site. Accordingly, by use of this data, starting in this operatable site an application program which operated in the usual operation site makes it possible to restart the operation.

In the above-mentioned example, the disaster recovery system having the 3DC configuration constituted of three data centers was described. However, the present invention can also be applied in a similar manner to a disaster recovery system including four data centers or more.

Thus, according to the present invention, when the production site where the usual operation is performed suffers from a disaster, it is possible to quickly recover data at the time of the disaster by executing a disaster recovery management program from a site in which no failure occurs, and then by restarting remote copy.

BRIEF DESCRIPTION OF THE DRAWINGS

FIG. 7 is a diagram illustrating a configuration of an intra-subsystem pair definition table 400 as an example;

FIG. 8 is a diagram illustrating a configuration of a volume definition table 500 as an example;

FIG. 9 is a diagram illustrating contents of a copy management table 600 that is stored in a management-information storing volume;

FIG. 10 is a flowchart illustrating processing of a volume definition program 122;

FIG. 11 is a flowchart illustrating processing of a disaster recovery management program P120; and FIG. 12 is a flowchart illustrating processing of a disaster recovery management program R121 executed when only the production site 3 suffers from a disaster.

DESCRIPTION OF THE PREFFERRED EMBODIMENTS

Embodiments according to the present invention will be described with reference to FIGS. 1 through 12 as below.

To begin with, a configuration of a computer system having a failure recovery function according to the present invention will be described with reference to FIG. 1.

Figure 1:
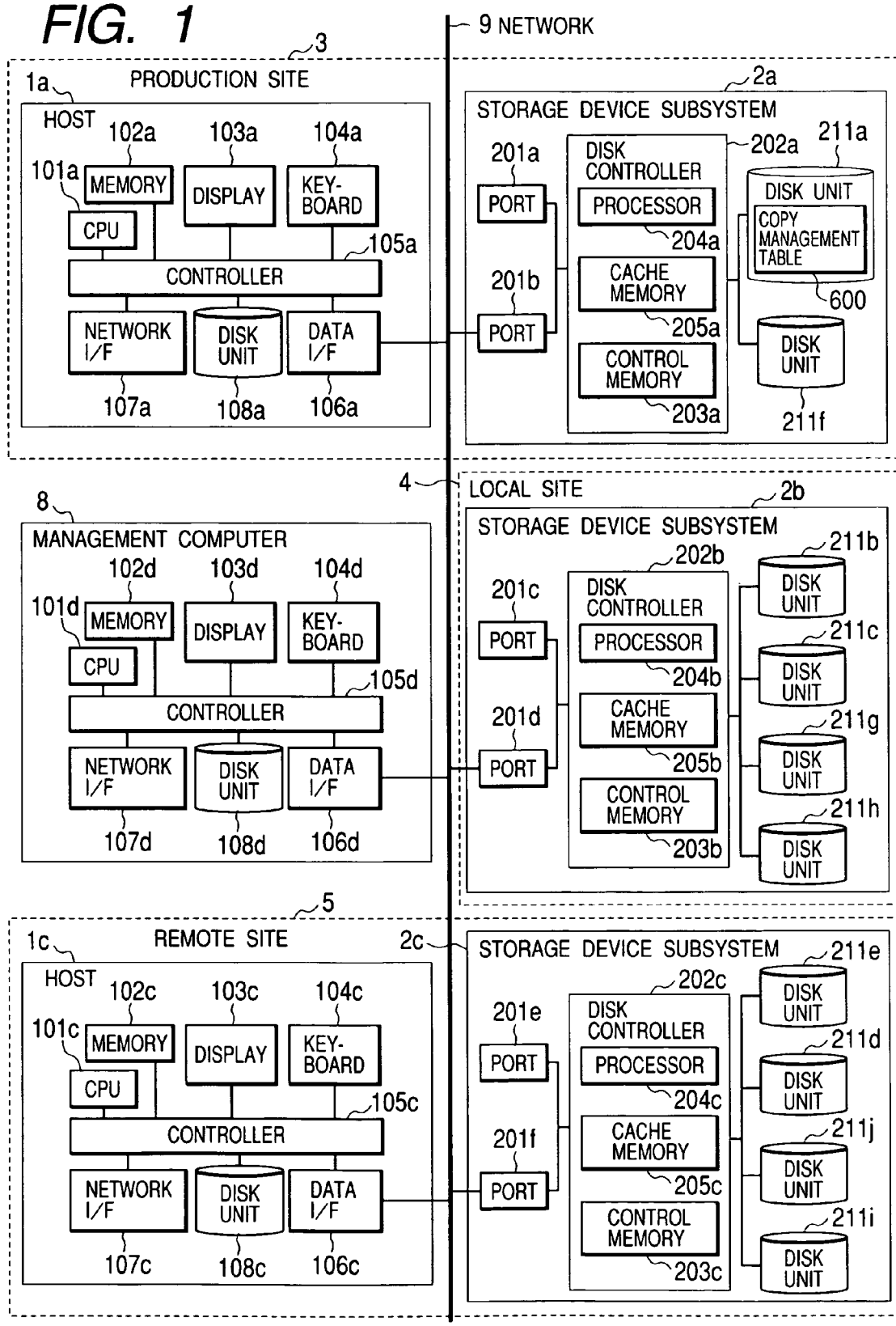
FIG. 1 is a configuration diagram illustrating a computer system having a failure recovery function according to the present invention.

FIG. 1 is a configuration diagram of the computer system having the failure recovery function according to the present invention.

This system comprises a host 1a, a host 1c, a storage device subsystem 2a, a storage device subsystem 2b, a storage device subsystem 2c, and a management computer 8. These units are mutually connected through a network 9. In this system, both the host 1a and the storage device subsystem 2a as a whole is called a production site 3; the storage device subsystem 2b is called a local site 4; and both the host 1c and the storage device subsystem 2c as a whole is called a remote site 5. This system is based on the assumption that the local site has no host. This system is also based on the assumptions that usually the production site 3 and the local site 4 are geographically near each other (the distance between the sites is several tens kilometers), and that usually the local site 4 and the remote site 5 are geographically far each other (the distance between the sites is several hundred kilometers). The production site 3 is a site where operation is usually executed; and the local site 4 and the remote site 5 are sites where the production site 3 is backed up. As described above, this embodiment describes the case where there are three sites. The present invention, however, can also be applied in a similar manner to a case where there are four sites or more.

The host 1 and the management computer 8 are computers, each of which comprises a CPU 101, a memory 102, a display 103, a keyboard 104, a controller 105, a data interface 106, a network interface 107, and a disk unit 108.

The storage device subsystem 2 is a storage device for storing data, and comprises a port 201, a disk controller 202, a control memory 203, a processor 204, a cache memory 205, and a disk unit 211.

The disk units 108 and 211 are logical storage devices. In actuality, a plurality of physical storage devices may also constitute one logical storage device. In this case, a plurality of physical storage devices may also constitute a disk array. Here, the physical storage device is a physical storage device such as a hard disk drive and a DVD.

An example of how a remote copy operates in this system will be described. Data of a disk unit 211a in the primary site 3 is remote-copied to a disk unit 211b in the local site 4. Data of the disk unit 211b is copied to a disk unit 211c in the same local site; and data of the disk unit 211c is remote-copied to a disk unit 211d in the remote site. Data of the disk unit 211d is copied to a disk unit 211e in the same remote site. In this manner, data of the production site 3 used for usual operation is successively copied to the local site 4 and the remote site 5.

Next, how in this system a program and data are stored in both a memory and a disk unit will be described with reference to FIGS. 2 through 5.

Figure 2:
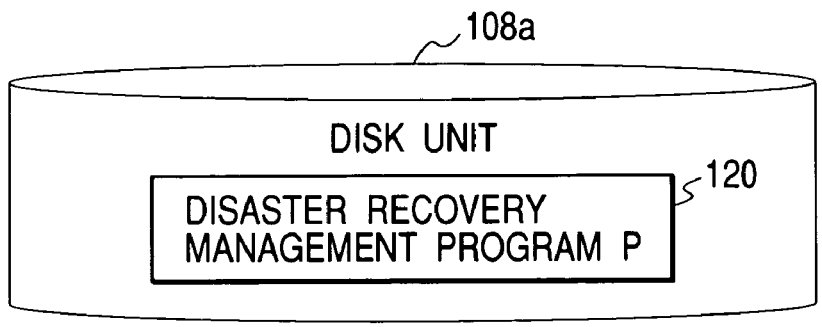
FIG. 2 is a diagram illustrating contents stored in a disk unit 108a of a host 1a included in a production site 3.

FIG. 2 is a diagram illustrating contents stored in a disk unit 108a of the host 1a in the production site 3.

Figure 3:
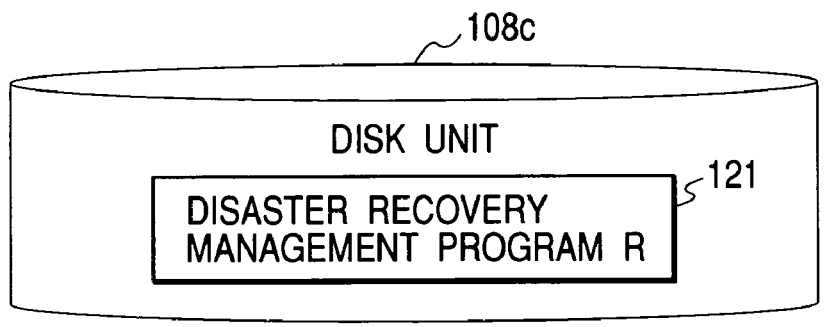
FIG. 3 is a diagram illustrating contents stored in a disk unit 108c of a host 1c included in a remote site 5.

FIG. 3 is a diagram illustrating contents stored in a disk unit 108c of the host 1c in the remote site 5.

Figure 4:
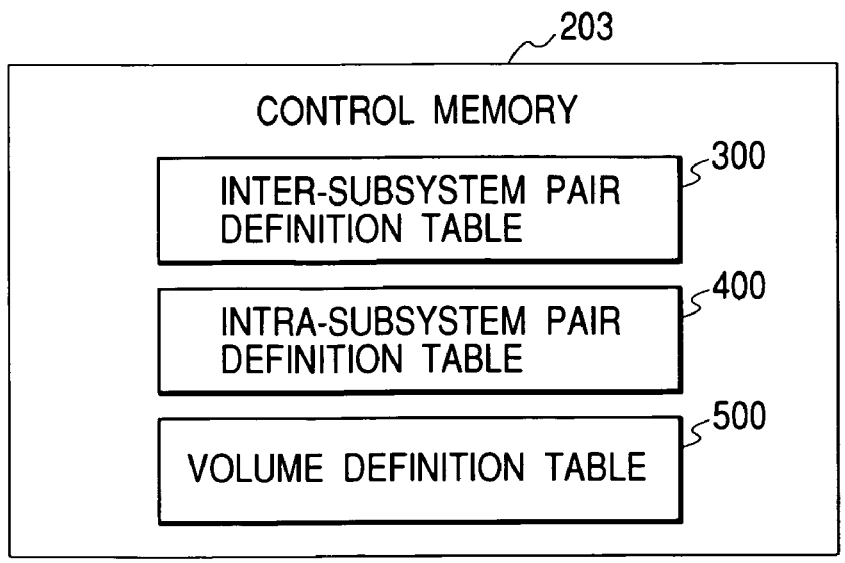
FIG. 4 is a detailed diagram illustrating contents stored in a control memory 203.

FIG. 4 is a detailed diagram illustrating contents stored in the control memory 203.

Figures 5, 6:
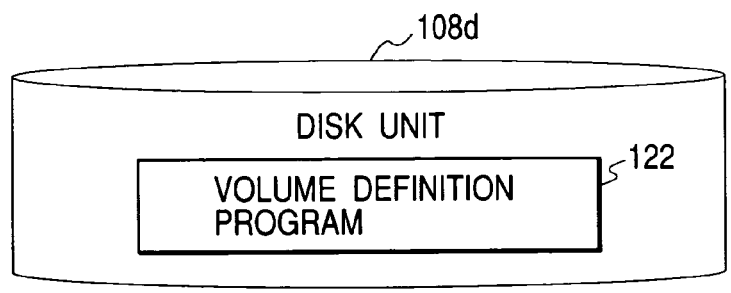
FIG. 5 is a diagram illustrating contents stored in a disk unit 108d of a management computer 8.
FIG. 6 is a diagram illustrating a configuration of an inter-subsystem pair definition table 300 as an example.

FIG. 5 is a diagram illustrating contents stored in a disk unit 108d of the management computer 8.

As shown in FIG. 2, a disaster recovery management program P120 is stored in the disk unit 108a. This program is read into a memory 102a, and is then executed by a CPU 101a. The disaster recovery management program P120 controls a remote copy from the production site 3 to the remote site 5 through the local site 4.

As shown in FIG. 3, a disaster recovery management program P121 is stored in the disk unit 108c. The disaster recovery management program R121 is read into a memory 102c, and is then executed by a CPU 101c. If the production site 3 suffers from a disaster, or if both the production site 3 and the local site 4 suffer from a disaster, the disaster recovery management program R121 executes recovery processing.

As shown in FIG. 4, an inter-subsystem pair definition table 300, an intra-subsystem pair definition table 400, and a volume definition table 500 are stored in the control memory 203. These tables will be described in detail later.

As shown in FIG. 5, a volume definition program 122 is stored in the disk unit 108d. The volume definition program 122 is read into a memory 102d, and is then executed by a CPU 101d. The volume definition program 122 will be described in detail later.

Next, data structures of tables used in this system will be described with reference to FIGS. 6 through 9.

FIG. 6 is a diagram illustrating a configuration of the inter-subsystem pair definition table 300 as an example.

FIG. 7 is a diagram illustrating a configuration of the intra-subsystem pair definition table 400 as an example.

FIG. 8 is a diagram illustrating a configuration of the volume definition table 500 as an example.

FIG. 9 is a diagram illustrating contents of a copy management table 600 that is stored in a management-information storing volume.

The inter-subsystem pair definition table 300 is stored in the control memory 203 of the storage device subsystem 2. As shown in FIG. 6, the inter-subsystem pair definition table 300 comprises a group name field 301, a pair name field 302, a main port field 303, a main logical unit field 304, a sub port field 305, a sub logical unit field 306, and a state field 307.

As shown in FIG. 6, the group name field 301 is a field to which a name of a group formed of associated pairs is written. The pair name field 302 is a field to which a name of an associated pair is written. The main port field 303 is a field to which information on a port of a storage device subsystem in a main site constituting one of the associated pair is written. The main logical unit field 304 is a field to which a logical unit name of the storage device subsystem in the main site constituting one of the associated pair is written. The sub port field 305 is a field to which information on a port of a storage device subsystem in a sub site constituting the other of the associated pair is written. The sub logical unit field 306 is a field to which a logical unit name of the storage device subsystem in the sub site constituting the other of the associated pair is written. The state field 307 is a field to which information indicating a state of the associated pair is written.

Here, a logical unit (hereinafter referred to as LU) is a unit by which a storage area formed of the disk unit 211 is managed. In addition, a volume is uniquely identified by a combination of a port name of a port used to access a LU and a LU name of the LU forming the volume. Therefore, a volume is expressed hereinafter by use of a port name and a LU name (port name, LU name). It is to be noted that although one LU corresponds to one volume in this embodiment, a plurality of LUs may also constitute one volume.

The example in FIG. 6 illustrates inter-subsystem pairs in the configuration shown in FIG. 1. A record 310a has a pair P1 belonging to a group GI. In this case, the following are shown: a volume of a main site forming the P1 is a volume (port 201b, LU0); a volume of a sub site forming the P1 is a volume (port 201d, LU0); and a state is ACTIVE. Here, the ACTIVE indicates that data replication processing between the pair shown in the record 310a (more specifically, synchronization of data contents in the main site with those in the sub site) is being performed.

Next, the intra-subsystem pair definition table 400 is stored in the control memory 203 of the storage device subsystem 2. As shown in FIG. 7, the intra-subsystem pair definition table 400 comprises a pair name field 402, a main logical unit field 403, a sub logical unit field 404, and a state field 405.

The pair name field 402 is a field to which a name of an associated pair is written. The main logical unit field 403 is a field to which a name of a main logical unit forming one of the associated pair is written. The sub logical unit field 404 is a field to which a name of a sub logical unit forming the other of the associated pair is written. The state field 405 is a field to which information indicating a state of the associated pair is written.

The example in FIG. 7 illustrates intra-subsystem pairs in the configuration shown in FIG. 1. An intra-subsystem pair definition table 400b is stored in a control memory 203b; and an intra-subsystem pair definition table 400c is stored in a control memory 203c. The record 410a has a pair P10. In this case, a main volume constituting one of the P10 is a volume (port 201d, LU0); a sub volume constituting the other of the P10 is a volume (port 201d, LU1); and a state is ACTIVE.

Here, the ACTIVE indicates that data replication processing between the pair shown in the record 410a (more specifically, synchronization of data contents in the main logical unit with those in the sub logical unit) is being performed.

Next, the volume definition table 500 is stored in the control memory 203 of the storage device subsystem 2. As shown in FIG. 8, the volume definition table 500 comprises a port field 501, a LU field 502, a drive field 503, a size field 504, and a management-information storing field 505.

The port field 501 is a field to which information on a port for identifying a volume is written. The LU field 502 is a field to which information on a LU constituting a part of the volume is written. The drive field 503 is a field to which information on the disk unit 211 constituting a part of the volume is written. The size field 504 is a field to which information on the size of the volume is written. The management-information storing field 505 is a field that indicates whether or not management information is stored.

The volume definition table 500 is set beforehand by a user using the volume definition program 122. Here, the volume definition program 122 is a program that is executed by the management computer 8 connected to the network 3. Through the management computer 8, the user transmits to the storage device subsystem 2 information on a volume to be set in the storage device subsystem 2. The storage device subsystem 2 writes the transmitted information to the volume management table 500.

The example in FIG. 8 shows the volume used in the configuration in FIG. 1. A volume definition table 500a is stored in a control memory 203a; a volume definition table 500b is stored in a control memory 203b; and a volume definition table 500c is stored in a control memory 203c. A record 510b shows the following: a volume (port 201b, LU1) is formed of a disk unit 211f; the size of the volume is 10 GB (gigabytes); and whether or not management information is stored is YES. Here, YES indicates that management information is stored. To be more specific, YES indicates that this volume is a management-information storing volume (hereinafter the management-information storing volume may also be called a management-information storing disk unit).

Next, a copy management table 600 shown in FIG. 9 is a table that stores information for managing states of inter-subsystem copy and intra-subsystem copy. The copy management table 600 is stored in a file having a predetermined file name. The disaster recovery management program P120 updates the copy management table 600 by overwriting this file in a management-information storing disk unit (disk unit 211a) of the primary site 3 whenever necessary.

Its contents are then successively transmitted to the disk unit 211b, the disk unit 211c, the disk unit 211d, and the disk unit 211e by use of an inter-subsystem copy function and an intra-subsystem copy function.

An executing state and an execution (frozen) state are set to a state of an inter-subsystem copy from the storage device subsystem 2a to the storage device subsystem 2b. An executing state and a disconnected state are set to a state of an intra-subsystem copy of the storage device subsystem 2b. An executing state and an interrupted state are set to a state of an inter-subsystem copy from the storage device subsystem 2b to the storage device subsystem 2c. An executing state and a disconnected state are set to a state of an intra-subsystem copy of the storage device subsystem 2c. What is set to the time stamp 605 is information on the time at which this record is written.

Next, steps of the failure recovery of a computer system according to the present invention will be described with reference to FIGS. 10 through 12.

To begin with, processing of the volume definition program 122 will be described with reference to FIG. 10.

FIG. 10 is a flowchart illustrating the processing of the volume definition program 122.

When the volume definition program 122 is started (step 1000), a user uses a display 103d and a keyboard 104d to set the following information (step 1005): information on the storage device subsystem 2 used for volume definition; information on a port used for identifying a volume; information on a LU constituting a part of the volume; information on the disk unit 211 constituting a part of the volume; information on the size of the volume; and information indicating whether or not management information is stored.

After that, the set definition information is sent to the specified storage device subsystem 2 (step 1010), and then the processing ends (step 1015). In the storage device subsystem 2 to which the definition information has been sent, the definition information is set to the volume definition table 500.

Next, processing of the disaster recovery management program P120 will be described with reference to FIG. 11.

FIG. 11 is a flowchart illustrating the processing of the disaster recovery management program P120.

The disaster recovery management program P120 is read into the memory 102a, and is then executed by the CPU 101a. The disaster recovery management program P120 controls a remote copy from the production site 3 to the remote site 5 through the local site 4.

What will be described next is the following control: performing an inter-subsystem copy from the storage device subsystem 2a to the storage device subsystem 2b; performing an intra-subsystem copy of the storage device subsystem 2b; performing an inter-subsystem copy from the storage device subsystem 2b to the storage device subsystem 2c; and performing an intra-subsystem copy of the storage device subsystem 2c. To be more specific, in this process, an inter-subsystem copy is performed from the disk unit 211f, which is a management-information storing volume, to disk unit 2119; an intra-subsystem copy is performed from the disk unit 2119 to the disk unit 211h; an inter-subsystem copy is performed from the disk unit 211h to the disk unit 211i; and an intra-subsystem copy is performed from the disk unit 211i to disk unit 2111.

Then, an inter-subsystem copy is performed from the disk unit 211a, which is not a management-information storing disk unit, to the disk unit 211b; an intra-subsystem copy is performed from the disk unit 211b to the disk unit 211c; an inter-subsystem copy is performed from the disk unit 211c to the disk unit 211d; and an intra-subsystem copy is performed from the disk unit 211d to the disk unit 211e. It is to be noted that in the description below, by use of a command, the disk controller 202 is instructed to execute an inter-subsystem copy or an intra-subsystem copy.

When the disaster recovery management program P120 is started (step 1100), the disk controller is instructed to execute an inter-subsystem copy from the storage device subsystem 2a to the storage device subsystem 2b, and also to interrupt the other inter-subsystem copies; and in addition, the disk controller is instructed to disconnect an intra-subsystem copy (step 1105). Then, states of the inter-subsystem copies and the intra-subsystem copies at this point of time (more specifically, the state 601 of the inter-subsystem copy from the storage device subsystem 2a to the storage device subsystem 2b is an executing state; the state 602 of the intra-subsystem copy of the storage device subsystem 2b is a disconnected state; the state 603 of the inter-subsystem copy from the storage device subsystem 2b to the storage device subsystem 2c is an interrupted state; and the state 604 of the intra-subsystem copy of the storage device subsystem 2c is a disconnected state), and the time stamp 605, are set to the copy management table 600 (step 1107).

Next, the disk controller is instructed to resynchronize the intra-subsystem copy of the storage device subsystem 2b, and also to resynchronize the intra-subsystem copy of the storage device subsystem 2c (step 1110). Then, states of the inter-subsystem copies and the intra-subsystem copies at this point of time (more specifically, the state 601 of the inter-subsystem copy from the storage device subsystem 2a to the storage device subsystem 2b is an executing state; the state 602 of the intra-subsystem copy of the storage device subsystem 2b is an executing state; the state 603 of the inter-subsystem copy from the storage device subsystem 2b to the storage device subsystem 2c is an interrupted state; and the state 604 of the intra-subsystem copy of the storage device subsystem 2c is an executing state), and the time stamp 605, are set to the copy management table 600 (step 1112).

Next, the disk controller is instructed to freeze the execution of the inter-subsystem copy from the storage device subsystem 2a to the storage device subsystem 2b. Then, states of the inter-subsystem copies and the intra-subsystem copies at this point of time (more specifically, the state 601 of the inter-subsystem copy from the storage device subsystem 2a to the storage device subsystem 2b is an execution (frozen) state; the state 602 of the intra-subsystem copy of the storage device subsystem 2b is an executing state; the state 603 of the inter-subsystem copy from the storage device subsystem 2b to the storage device subsystem 2c is an interrupted state; and the state 604 of the intra-subsystem copy of the storage device subsystem 2c is an executing state), and the time stamp 605, are set to the copy management table 600 (step 1117).

Next, the disk controller is instructed to disconnect the intra-subsystem copy of the storage device subsystem 2b, and also to disconnect the intra-subsystem copy of the storage device subsystem 2c (step 1120). Then, states of the inter-subsystem copies and the intra-subsystem copies at this point of time (more specifically, the state 601 of the inter-subsystem copy from the storage device subsystem 2a to the storage device subsystem 2b is an execution (frozen) state; the state 602 of the intra-subsystem copy of the storage device subsystem 2b is a disconnected state; the state 603 of the inter-subsystem copy from the storage device subsystem 2b to the storage device subsystem 2c is an interrupted state; and the state 604 of the intra-subsystem copy of the storage device subsystem 2c is a disconnected state), and the time stamp 605, are set to the copy management table 600 (step 1122).

After that, the disk controller is instructed to restart the execution of the inter-subsystem copy from the storage device subsystem 2a to the storage device subsystem 2b (step 1125). Then, states of the inter-subsystem copies and the intra-subsystem copies at this point of time (more specifically, the state 601 of the inter-subsystem copy from the storage device subsystem 2a to the storage device subsystem 2b is an executing state; the state 602 of the intra-subsystem copy of the storage device subsystem 2b is a disconnected state; the state 603 of the inter-subsystem copy from the storage device subsystem 2b to the storage device subsystem 2c is an interrupted state; and the state 604 of the intra-subsystem copy of the storage device subsystem 2c is a disconnected state), and the time stamp 605, are set to the copy management table 600 (step 1127).

Next, the disk controller is instructed to execute the resynchronization of the inter-subsystem copy from the storage device subsystem 2b to the storage device subsystem 2c (step 1130). Then, states of the inter-subsystem copies and the intra-subsystem copies at this point of time (more specifically, the state 601 of the inter-subsystem copy from the storage device subsystem 2a to the storage device subsystem 2b is an executing state; the state 602 of the intra-subsystem copy of the storage device subsystem 2b is a disconnected state; the state 603 of the inter-subsystem copy from the storage device subsystem 2b to the storage device subsystem 2c is an executing state; and the state 604 of the intra-subsystem copy of the storage device subsystem 2c is a disconnected state), and the time stamp 605, are set to the copy management table 600 (step 1132).

Next, the disk controller is instructed to interrupt the inter-subsystem copy from the storage device subsystem 2b to the storage device subsystem 2c (step 1135). Then, states of the inter-subsystem copies and the intra-subsystem copies at this point of time (more specifically, the state 601 of the inter-subsystem copy from the storage device subsystem 2a to the storage device subsystem 2b is an executing state; the state 602 of the intra-subsystem copy of the storage device subsystem 2b is a disconnected state; the state 603 of the inter-subsystem copy from the storage device subsystem 2b to the storage device subsystem 2c is an interrupted state; and the state 604 of the intra-subsystem copy of the storage device subsystem 2c is a disconnected state), and the time stamp 605, are set to the copy management table 600 (step 1137).

This results in the same state as that immediately after the execution of the step 1105. Accordingly, the processing after the step 1110 is repeatedly executed. As a result of the processing described above, contents of both the disk unit 211a and the disk unit 211f in the production site 3 are copied to the disk unit 211e and the disk unit 211j in the remote site 5 through the local site 4.

It is to be noted that when the copy management table is updated in the step 1107, 1112, 1117, 1122, 1127, 1132, or 1137, copy management tables of the other sites are also updated in synchronization with this updated copy management table.

The disaster recovery management program R121 is a recovery processing program executed when the production site 3 suffers from a disaster, or when both the production site 3 and the local site 4 suffer from a disaster. The disaster recovery management program R121 is read into the memory 102c in the remote site 5, and is then executes by the CPU 101c.

What will be lastly described with reference to FIG. 12 is processing of the disaster recovery management program P121 executed when only the production site 3 suffers from a disaster.

FIG. 12 is a flowchart illustrating the processing of the disaster recovery management program R121 executed when only the production site 3 suffers from a disaster.

In the first place, the disaster recovery management program R121 is started when a disaster occurs (step 1200). Copy management information 600 is collected from all of surviving disk units for storing management information, which survive after the disaster. After that, each time stamp value of the time stamp 605 of the collected copy management tables 600 is checked. Then, on the basis of copy state information (the state 601 of the inter-subsystem copy from the storage device subsystem 2a to the storage device subsystem 2b; the state 602 of the intra-subsystem copy of the storage device subsystem 2b; the state 603 of the inter-subsystem copy from the storage device subsystem 2b to the storage device subsystem 2c; and the state 604 of the intra-subsystem copy of the storage device subsystem 2c) in the management table 600 having the newest time stamp value, a point to which the flowchart of FIG. 11 has been executed is kept track of, and the processing shown in the flowchart of FIG. 11 is restarted (step 1220). When the last copy processing is completed, the processing ends (step 1230). As a result, data is transferred to the disk unit 211e and the disk unit 211j in the remote site 5.

If both the production site 3 and the local site 4 suffer from a disaster, a surviving site is only the remote site 5. Accordingly, the disaster recovery management program R121 executes only the processing of the step 1110 in FIG. 11.

As a result of the above-mentioned processing, the newest data immediately before the production site 3 has suffered from the disaster has been transferred to the remote site 5. Therefore, by use of this data, starting in the remote site 5 an application program which operated in the production site 3 making it possible to restart the operation.

What is claimed is:

1. A computer system having a first operation site, a second site having a storage device subsystem and a third operation site that are mutually connected through a network, wherein:
    each said operation site includes a host and a storage device subsystem and a copy management program that operates in the host;
    copy management information that includes state information is used by the copy management program to execute remote copy processing from the storage device subsystem of said first operation site to the storage device subsystem of the second site and to the storage device subsystem of said third operation site;
    said copy management information is stored in said storage device subsystems of each said operation site and said second site, and is updated every time a remote copy is executed;
    wherein when a failure occurs in the first said operation site, the copy management information stored in the storage device subsystems is referred by use of said copy management program that operates in a host included in said third operation site to execute copying from a point at which copy processing had progressed before the failure;
    wherein said storage device subsystems make an inter-subsystem copy of data stored in a storage device between the storage device subsystems of the first operation site and the second site, and the second site and the third operation site, and an intra-subsystem copy of data stored in a storage device in the storage device subsystem of the second site and in a storage device of a storage device subsystem in the third operation site, and
    wherein said copy management information includes state information about the inter-subsystem copy, state information about the intra-subsystem copy, and time stamp information about the time at which this copy management information is written.

2. A failure recovery method for a computer system in which at least first and other operation sites each having a host and a storage device subsystem and a second site having a storage device subsystem are mutually connected through a network, said failure recovery method comprising the steps of:
    using, at the first operation site, a copy management program, which operates in the host, to remote-copy data stored in a storage device of the storage device subsystem included in the first operation site to a storage device of a storage device subsystem included in the second site and each of the other operation sites;
    every time copy processing is performed, reflecting, by the first operation site, a state of the remote copy in copy management information stored in the storage device of the storage device subsystem included in the first operation site;
    every time copy processing is performed, reflecting, to the second site and each of the other operation sites, a state of the remote copy in the copy management information stored in the storage device of the storage device subsystem included in said second site and each of the other operation sites,
    wherein when a failure occurs at the first operation site, the copy management information stored in the storage device of the storage device subsystem included in the second site and each of the other operation sites is referred by use of a copy management program that operates in a host included in one of the other operation sites to execute copying from a point to which the copy processing had progressed before the failure;
    wherein said step of remote-copying from the first operation site comprises inter-subsystem copying of data in a storage device which is performed between the storage device subsystems of the first operation site and the second site, and between storage device subsystems of the second operation site and other operation sites, and intra-subsystem copying of data in a storage device which is performed in the storage device subsystems of any of the first operation site, second site and other operation sites; and
    said copy management information includes state information about each of the inter-subsystem copies and the intra-subsystem copies.

* * * * *